United States Patent
Maier et al.

(10) Patent No.: US 11,993,913 B2
(45) Date of Patent: May 28, 2024

(54) CABLE PLOW SYSTEM

(71) Applicant: Frank Föckersperger GmbH, Aurachtal-Münchaurach (DE)

(72) Inventors: Roland Maier, Weisendorf-Buch (DE); Armin Kress, Aurachtal (DE)

(73) Assignee: FRANK FÖCKERSPERGER GMBH, Aurachtal-Münchaurach (DE)

( * ) Notice: Subject to any disclaimer, the term of this patent is extended or adjusted under 35 U.S.C. 154(b) by 68 days.

(21) Appl. No.: 17/372,322

(22) Filed: Jul. 9, 2021

(65) Prior Publication Data

US 2022/0010524 A1    Jan. 13, 2022

(51) Int. Cl.
*E02F 5/10*     (2006.01)
*B62D 33/063*   (2006.01)
*F16L 1/028*    (2006.01)

(52) U.S. Cl.
CPC .............. *E02F 5/10* (2013.01); *B62D 33/063* (2013.01); *F16L 1/028* (2013.01)

(58) Field of Classification Search
CPC .. E02F 5/10; E02F 5/102; E02F 5/106; H02G 1/06; F16L 1/028
See application file for complete search history.

(56) References Cited

U.S. PATENT DOCUMENTS

| | | | | |
|---|---|---|---|---|
| 4,103,443 A | * | 8/1978 | Pelsy | E02F 5/102 |
| | | | | 280/460.1 |
| 4,588,034 A | * | 5/1986 | Leonard | E02F 5/103 |
| | | | | 172/699 |
| 9,708,791 B2 | * | 7/2017 | Strutynsky | E02F 5/101 |

FOREIGN PATENT DOCUMENTS

| | | |
|---|---|---|
| DE | 17 73 060 | 8/1958 |
| DE | 26 41 309 | 3/1978 |
| DE | 10 2016 111 012 | 12/2017 |
| FR | 646 560 | 11/1928 |

* cited by examiner

*Primary Examiner* — Sean D Andrish
(74) *Attorney, Agent, or Firm* — Workman Nydegger

(57) ABSTRACT

The invention relates to a cable plow system, comprising a cable plow for introducing at least one line into the ground and a chassis, wherein the cable plow comprises at least one laying unit, wherein the or each laying unit has an attachment suitable for engaging the ground to form a trench in the soil and a line routing for laying the line into the trench formed or formable by the attachment, wherein the chassis comprises a driver's cab and front wheels and rear wheels, wherein the front wheels and/or the rear wheels are attached in each case to the driver's cab by means of a support. The invention is characterized in that the cable plow system has a coupling device, the chassis and the cable plow being interchangeably connectable or connected to one another by means of the coupling device.

10 Claims, 2 Drawing Sheets

CABLE PLOW SYSTEM

CROSS-REFERENCE TO RELATED APPLICATIONS

The present invention claims the benefit of priority to German Patent Application No. 10 2020 118 288.0, filed on Jul. 10, 2020, the entire content which is incorporated herein by reference.

BACKGROUND OF THE INVENTION

1. Field of the Invention

The invention relates to a cable plow system.

2. The Relevant Technology

Cable plow systems of this type comprise a cable plow for introducing at least one line, in particular a pipe or cable, into the ground and a chassis, wherein the cable plow comprises at least one laying unit, wherein the or each laying unit has an attachment suitable for engaging the ground to form a trench in the soil and a line routing for laying the line into the trench formed or formable by the attachment, wherein the chassis comprises a driver's cab and front wheels and rear wheels, wherein the front wheels and/or the rear wheels are attached in each case to the driver's cab by means of a support.

The driver's cab is not only understood to mean the standing or sitting location of a driver, but rather the entire central body of the chassis, on which the front and/or rear wheels are movably attached, in each case via their supports.

Disadvantages of known cable plow systems are that the transport of the cable plow together with the chassis to the operation site is extremely complex. For this purpose, the cable plow system has to be loaded onto heavy-duty transporters using load cranes, if necessary after laborious separation of the chassis from the cable plow. Subsequently, the cable plow system or the components thereof have to be unloaded at the operation site again by means of load cranes, possibly assembled in a complex manner, and brought into the operational position, for example in a starting pit.

There is therefore a need for a way of separating the cable plow from the chassis or to connect the two units to one another again later in a simple and time saving manner. Furthermore, there is a need for a way of loading the cable plow in which additional devices, such as heavy-duty cranes, can be dispensed with.

BRIEF SUMMARY OF THE INVENTION

It is therefore the object of the invention to specify a new cable plow system, in particular a new cable plow system, which allows for a simple and quick coupling or uncoupling of the cable plow and the chassis.

This object is achieved by a cable plow system with the features of at least one laying unit, wherein the at least one laying unit has an attachment suitable for engaging the ground to form a trench in a soil and a line routing for laying the at least one line into the trench formed or formable by the attachment. The above object is further achieved by the cable plow system having the features of the chassis including a cab configured to accommodate a driver and front wheels and rear wheels, wherein the front wheels and/or the rear wheels are respectively attached to the cab by means of respective supports-Additionally, the above object is achieved by the cable plow system having the features of the cable plow system having a coupling device, the chassis and the cable plow being interchangeably connectable or connected to one another by means of the coupling device. Advantageous embodiments and developments are provided in the following disclosure.

The cable plow according to the invention is characterized in that the cable plow system has a coupling device, the chassis and the cable plow being interchangeably connectable or connected to one another by means of the coupling device.

A substantial advantage of the invention is that the cable plow can be easily and quickly separated from the chassis or reconnected thereto. In this way, the chassis can also be used in other ways, for example in conjunction with an alternative cable plow or a trench cutter or a cable drum transporter, and can therefore be used in a wide variety of ways.

Furthermore, the separate transport of the cable plow and chassis to and from the operation site is possible without any problems. The cable plow can also be loaded onto and unloaded from a transporter through the chassis, without the need for additional devices, such as heavy-duty cranes. The chassis itself can also be loaded and unloaded without such additional devices.

Another advantage of the invention lies in the fact that the cable plow connected to the chassis can be optimally controlled by the chassis during work, in particular by the adjustable supports. Furthermore, tilting of the cable plow during work can be avoided by the chassis.

The chassis is preferably designed to be self-propelled, the chassis in particular comprising a motor.

The chassis preferably comprises two front wheels and two rear wheels. The supports are preferably designed as a double arm in each case.

The coupling device is or comprises particularly preferably at least one eye-bolt connection. Two or more eye-bolt connections are preferably provided.

It can be provided that each eye-bolt connection has at least one first eye and at least one second eye as well as a bolt, the first eye being arranged on the cable plow and the second eye being arranged on the driver's cab, the cable plow and chassis being connectable or connected by means of the bolt guided through the first eye and the second eye.

It is preferably provided that the or each eye-bolt connection comprises at least one holding means with a first eye and at least one fork with two pins, each pin having a second eye, the holding means being mountable or mounted between the two pins of the fork so that the first eye and the two second eyes form a common through opening, and the or each eye-bolt connection comprising at least one bolt, the bolt for connecting the chassis and the cable plow being guidable or guided into or through the through opening.

The holding means can be arranged on the cable plow and the fork can correspondingly be arranged on the chassis. Alternatively, however, the fork can also be arranged on the cable plow and the holding means can be arranged on the chassis.

Preferably, the bolt of the or of each eye-bolt connection is arranged, in particular hydraulically, in an extendable manner on the driver's cab, in particular on the underside or in a lower region of the driver's cab, or on the cable plow, in particular on the upper side or in an upper region of the cable plow, and is movable into the through opening in order to connect to the corresponding first and second eyes.

According to one development of the invention, each support has a side adjustment device for adjusting the angle of inclination of the support in relation to a planned direction of travel. In the case of the side adjustment devices, the supports can in particular be moved in a substantially horizontal plane. For example, the cable plow system, viewed in the direction of travel, can be adjusted to be narrower by pulling the supports up to the driver's cab and wider by pushing the supports away from the driver's cab. It is also possible, for example, to pull the supports toward the driver's cab on one side of the driver's cab, as seen in the direction of travel, and to extend them on the other side, in order to plow close to an obstacle or a boundary in this way.

It can be provided that the side adjustment device can be adjusted pneumatically and/or mechanically and/or hydraulically. The side adjustment device is preferably hydraulically adjustable, the side adjustment device comprising a hydraulic cylinder which is arranged between the support and the driver's cab.

According to one embodiment of the invention, each support has a height adjustment device for adjusting the angle of inclination of the support in relation to the ground surface. In the case of the height adjustment devices, the supports can in particular be moved in a substantially vertical plane. If, for example, all supports are lowered, the driver's cab is raised accordingly, and vice versa. By adjusting the height of the supports at different heights, any unevenness in the terrain can also be compensated for.

It can be provided that the height adjustment device can be adjusted pneumatically and/or mechanically and/or hydraulically. The height adjustment device is preferably hydraulically adjustable, the height adjustment device comprising in particular a hydraulic cylinder which is arranged between the support and the driver's cab.

One preferred embodiment of the invention provides that the driver's cab can be raised by means of the height adjustment devices of the supports relative to the ground surface by a height that is greater than the height of the cable plow, so that the driver's cab is movable or moved in order to connect the cable plow and chassis via the cable plow.

A cable plow connected to the chassis can also be raised by means of the height adjustment device.

Furthermore, it can be provided that the holding means of the or of each eye-bolt connection is arranged on the upper side or in an upper region of the cable plow, and the fork of the or of each eye-bolt connection is arranged on the underside or in a lower region of the driver's cab of the chassis, so that the or each holding means is connectable to the or to a corresponding fork by means of the bolt when the driver's cab has moved over the cable plow.

It can be provided that the fork of the or of each eye-bolt connection is arranged in the intended direction of travel in a front region of the driver's cab.

According to one embodiment of the invention, the chassis has a carriage and the cable plow has a carriage mount, the carriage being mountable or mounted with a precise fit into the carriage mount in order to connect the chassis to the cable plow, in that the carriage is being moved or is moved through the chassis into the carriage mount.

The carriage is preferably arranged at the front of the chassis in an intended direction of travel.

One development of the invention provides that the carriage of the chassis mounted in the carriage mount of the cable plow centers or positions the cable plow on the chassis in such a way that the holding means of the or of each eye-bolt connection is arranged or is being arranged between the pins of the associated fork.

It is particularly preferably provided that the cable plow comprises two or more, preferably three, laying units.

It can be provided that a number of line routing extensions corresponding to the number of laying units of the cable plow is arranged on the chassis, the line routing extensions being adjacent to the line routings of the laying units in a connected state of the chassis and the cable plow so that the line routings are extended by the line routing extension.

The cable plow system can furthermore comprise one or more towing vehicles for pulling the assembly of chassis and cable plow, in particular for pulling the cable plow through the ground.

BRIEF DESCRIPTION OF THE DRAWINGS

The invention is explained in more detail below also with regard to further features and advantages on the basis of the description of embodiments and with reference to the accompanying schematic drawings, in which.

Corresponding parts and components, also across the various embodiments, are identified by the same reference signs in FIG. 1 to FIG. 2b.

DETAILED DESCRIPTION OF THE PREFERRED EMBODIMENTS

Figure 1:
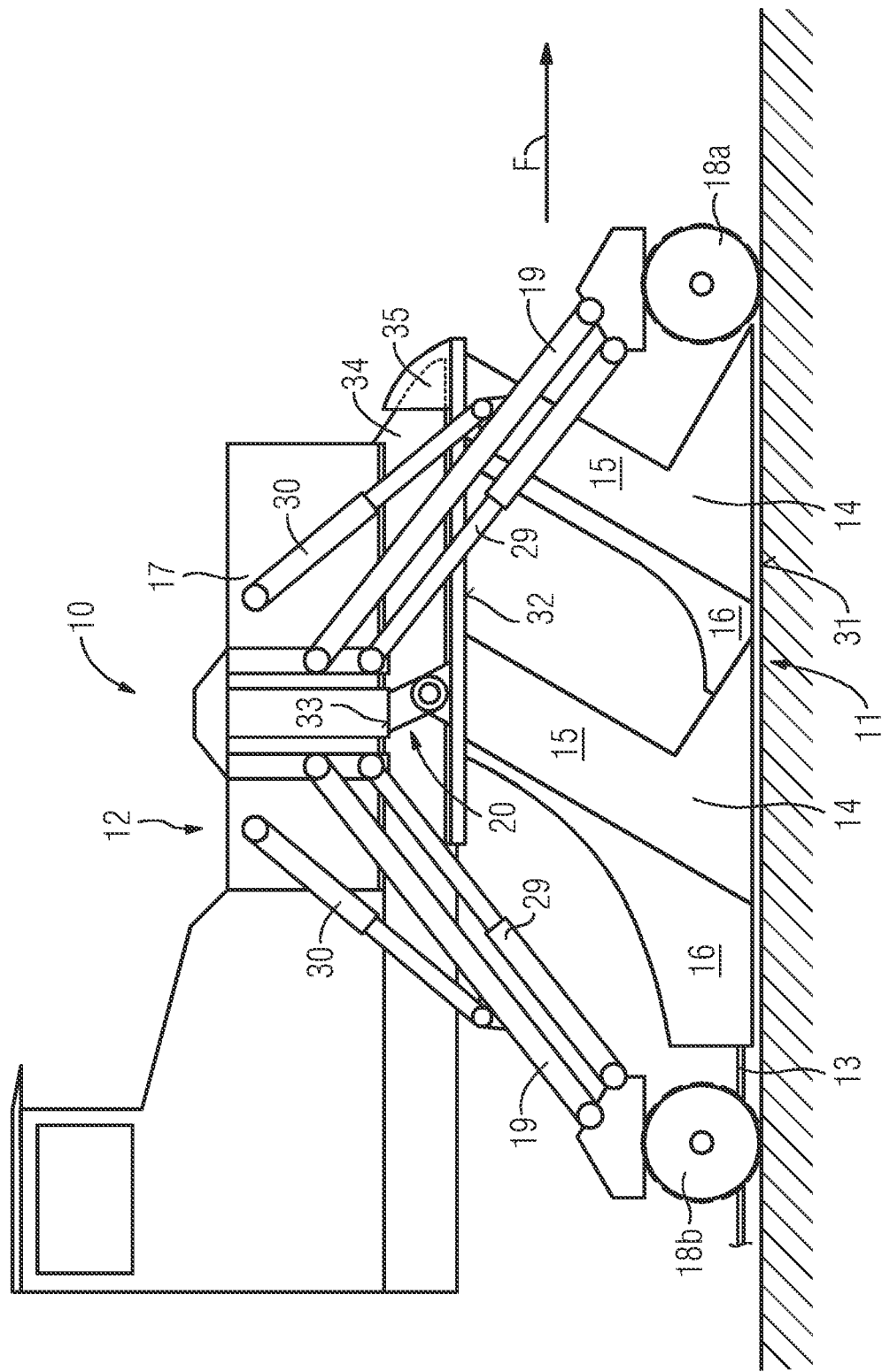
FIG. 1 is a schematic view from the side of an embodiment of a cable plow system according to the invention.

FIG. 1 shows a cable plow system 10 according to the invention comprising a chassis 12 and a cable plow 11 for introducing three lines 13, in particular pipes or cables, into the ground.

The cable plow 11 comprises two laying units 14, wherein each laying unit 14 has an attachment 15 suitable for engaging the ground to form a trench in the soil and a line routing 16 for laying a line 13 into the trench formed or formable by the attachment 15.

The chassis 12 comprises a driver's cab 17 and two front wheels 18a and two rear wheels 18b, wherein the front wheels 18a and the rear wheels 18b are attached in each case to the driver's cab 17 by means of a support 19. The supports 19 can be designed as a double arm in each case (not shown). The chassis 12 is designed to be motorized and self-propelled.

According to the invention, the cable plow system 10 has a coupling device 20, the chassis 12 and the cable plow 11 being interchangeably connected to one another by means of the coupling device 20.

Figure 2A:
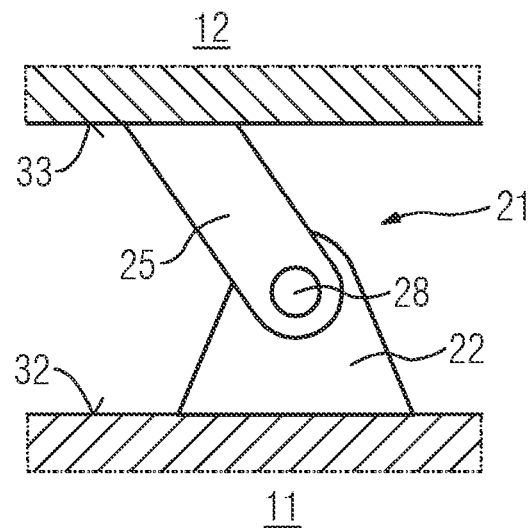
FIG. 2a is a schematic view from the side of an eye-bolt connection of the cable plow system according to the invention.
Figure 2B:
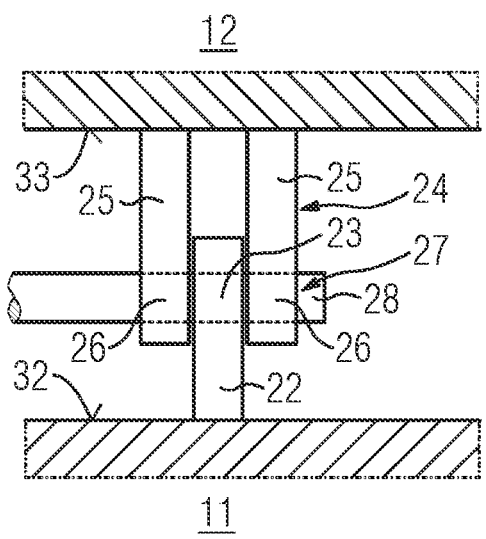
FIG. 2b is a schematic view from the front of an eye-bolt connection of the cable plow system according to the invention.

The coupling device comprises two eye-bolt connections 21, FIG. 2a and FIG. 2b showing an eye-bolt connection 21 in each case.

Each eye-bolt connection 21 comprises a holding means 22 with a first eye 23, the holding means 22 being arranged on the cable plow 11. Furthermore, each eye-bolt connection 21 comprises a fork 24 with two pins 25, each pin 25 having a second eye 26, the fork 25 being arranged on the chassis 12. The holding means 22 is mounted between the two pins 25 of the fork 24 in the connected state of the cable plow 11 and the chassis 12 so that the first eye 23 and the two second eyes 26 form a common through opening 27, as shown in particular in FIG. 2b. Each eye-bolt connection 21 also comprises a bolt 28, the bolt 28 for connecting the chassis 12 and the cable plow 11 being guided into the through opening 27.

FIG. 1 shows that each support 19 has a side adjustment device 29 for adjusting the angle of inclination of the support 19 in relation to a planned direction of travel F. The supports 19 can be moved away from and toward the driver's cab 17 in a plan view by means of the side adjustment device 29. The side adjustment device 29 is hydraulically adjustable, the side adjustment device 29 comprising a hydraulic cylinder which is arranged between the support 19 and the driver's cab 17.

Furthermore, each support 19 has a height adjustment device 30 for adjusting the angle of inclination of the support 19 in relation to the ground surface 31. The height adjustment device 30 is hydraulically adjustable, the height adjustment device 30 comprising a hydraulic cylinder which is arranged between the support 19 and the driver's cab 17.

The driver's cab 17 can be raised by means of the height adjustment devices 30 of the supports 19 relative to the ground surface 31 by a height that is greater than the height of the cable plow 11, so that the driver's cab 17 is movable or moved in order to connect the cable plow 11 and chassis 12 via the cable plow 11. In the embodiment in accordance with FIG. 1, the driver's cab 17 has moved to a height which is greater than the height of the cable plow 11.

The holding means 22 of the or of each eye-bolt connection 21 is arranged on the upper side 32 of the cable plow 11, and the fork 24 is arranged on the underside 33 of the driver's cab 17, so that each holding means 22 is connectable to the or to a corresponding fork 24 by means of the bolt 28 when the driver's cab 17 has moved over the cable plow 11.

The bolt 28 of the or of each eye-bolt connection 21 is arranged on the underside 33 of the driver's cab 17 such that it can be hydraulically extended and is movable into the through opening 28 in order to connect to the corresponding first and second eyes 23, 26.

FIG. 1 shows that the chassis 12 has a carriage 34 and the cable plow 11 has a carriage mount 35, the carriage 34 being mounted with a precise fit into the carriage mount 35 in order to connect the chassis 12 to the cable plow 11, in that the carriage 34 is being moved or is moved through the chassis 12 into the carriage mount 35. The carriage 34 is preferably arranged at the front of the chassis 12 in an intended direction of travel F.

The carriage 34 of the chassis 12 mounted in the carriage mount 35 of the cable plow 11 positions the cable plow 11 on the chassis in such a way that the holding means 22 of each eye-bolt connection 21 is arranged between the pin 25 of the associated fork 24.

A number of line routing extensions (not shown in the figures) corresponding to the number of laying units 14 of the cable plow 11 can be arranged on the chassis 12, the line routing extensions being adjacent to the line routings 16 of the laying units 14 in a connected state of the chassis 12 and the cable plow 11 so that the line routings 16 are extended by the line routing extensions.

The cable plow system 10 can further comprise one or more towing vehicles (not shown in the figures) for pulling the chassis 12 and the cable plow 11 through the ground.

To connect the chassis 12 and the cable plow 11, the chassis 12 is first moved to a height that is greater than the height of the cable plow 11. The chassis 12 is then moved over the cable plow 11 and connected to the cable plow 11 by means of the coupling device 20. Now the chassis 12 can lift the cable plow 11 and move it to the desired operation site. The chassis 12 can also move the cable plow to a transport vehicle and set it down thereon. The coupling device 20 can then be released again and the cable plow 11 can be moved to the operation site by means of the transport vehicle. At the operation site, the chassis 12 can be quickly and easily reconnected to the cable plow 11 for unloading the cable plow 11. The cable plow 11 can then be unloaded by the transport vehicle by means of the chassis 12. Furthermore, the chassis 12 can set the cable plow 11 in a starting pit before the laying process of the lines 13 begins.

LIST OF REFERENCE SIGNS

10 Cable plow system
11 Cable plow
12 Chassis
13 Line
14 Laying unit
15 Attachment
16 Line routing
17 Driver's cab
18a Front wheel
18b Rear wheel
19 Support
20 Coupling device
21 Eye-bolt connection
22 Holding means
23 First eye
24 Fork
25 Pins
26 Second eye
27 Through opening
28 Bolt
29 Side adjustment device
30 Height adjustment device
31 Ground surface
32 Upper side
33 Underside
34 Carriage
35 Carriage mount
F Direction of travel

We claim:

1. A cable plow system, comprising a cable plow for introducing at least one line into the ground and a chassis, wherein:
   the cable plow comprises at least one laying unit, wherein the at least one laying unit has an attachment suitable for engaging the ground to form a trench in a soil and a line routing for laying the at least one line into the trench formed or formable by the attachment;
   the chassis comprises a cab configured to accommodate a driver and front wheels and rear wheels, wherein the front wheels and/or the rear wheels are respectively attached to the cab by means of respective supports, wherein
   the cable plow system has a coupling device, wherein the coupling device is or comprises at least one eye-bolt connection, the chassis and the cable plow being interchangeably connectable or connected to one another by means of the coupling device,
   each of the respective supports has a height adjustment device for adjusting an angle of inclination of the respective supports in relation to a ground surface, and
   the cab can be raised by means of the height adjustment devices of the respective supports relative to the ground surface by a height that is greater than a height of the cable plow, so that the cab is movable to connect the cable plow and chassis via the cable plow.

2. The cable plow system according to claim 1, wherein each eye-bolt connection has at least one first eye and at least one second eye as well as a bolt;
the at least one first eye is arranged on the cable plow and the at least one second eye being arranged on the cab; and
the cable plow and chassis are connectable or connected by means of the bolt guided through the at least one first eye and the at least one second eye.

3. The cable plow system according to claim 2 wherein:
the cable plow comprises two or more laying units.

4. The cable plow system according to claim 2, the height adjustment devices are configured to raise the cab relative to the ground surface by a height that is greater than a height of the cable plow creating space between the ground and cab to connect the cable plow and chassis above the ground.

5. The cable plow system according to either claim 1, wherein each eye-bolt connection comprises:
at least one holding means with a first eye and at least one fork with two pins, each pin having a second eye, the at least one holding means being mountable or mounted between the two pins of the at least one fork so that the first eye and the two second eyes form a common through opening; and
at least one bolt, the at least one bolt for connecting the chassis and the cable plow being guidable or guided into or through the through opening.

6. The cable plow system according to claim 5, wherein the at least one bolt of each eye-bolt connection is:
arranged in an extendable manner on the cab or on the cable plow; and
movable into the through opening in order to connect to a corresponding eye of the at least one first eye and the at least one second eye.

7. The cable plow system according to claim 5, wherein:
the at least one holding means of each eye-bolt connection is arranged on an upper side or in an upper region of the cable plow; and
the at least one fork of each eye-bolt connection is arranged on an underside or in a lower region of the cab of the chassis, so that the at least one holding means is connectable to a corresponding fork by means of the at least one bolt when the cab has moved over the cable plow.

8. The cable plow system according to claim 1, wherein each of the respective supports has a side adjustment device for adjusting an angle of inclination of each of the respective supports in relation to a planned direction of travel (F).

9. The cable plow system according to claim 1, wherein:
the chassis has a carriage and the cable plow has a carriage mount; and
the carriage is mountable or mounted with a precise fit into the carriage mount in order to connect the chassis to the cable plow, in that the carriage is being moved or is moved through the chassis into the carriage mount.

10. The cable plow system according to claim 9, wherein the carriage of the chassis mounted in the carriage mount of the cable plow centers or positions the cable plow on the chassis in such a way that the at least one holding means of each eye-bolt connection is arranged between a pin of an associated fork.

* * * * *